Patented July 3, 1934

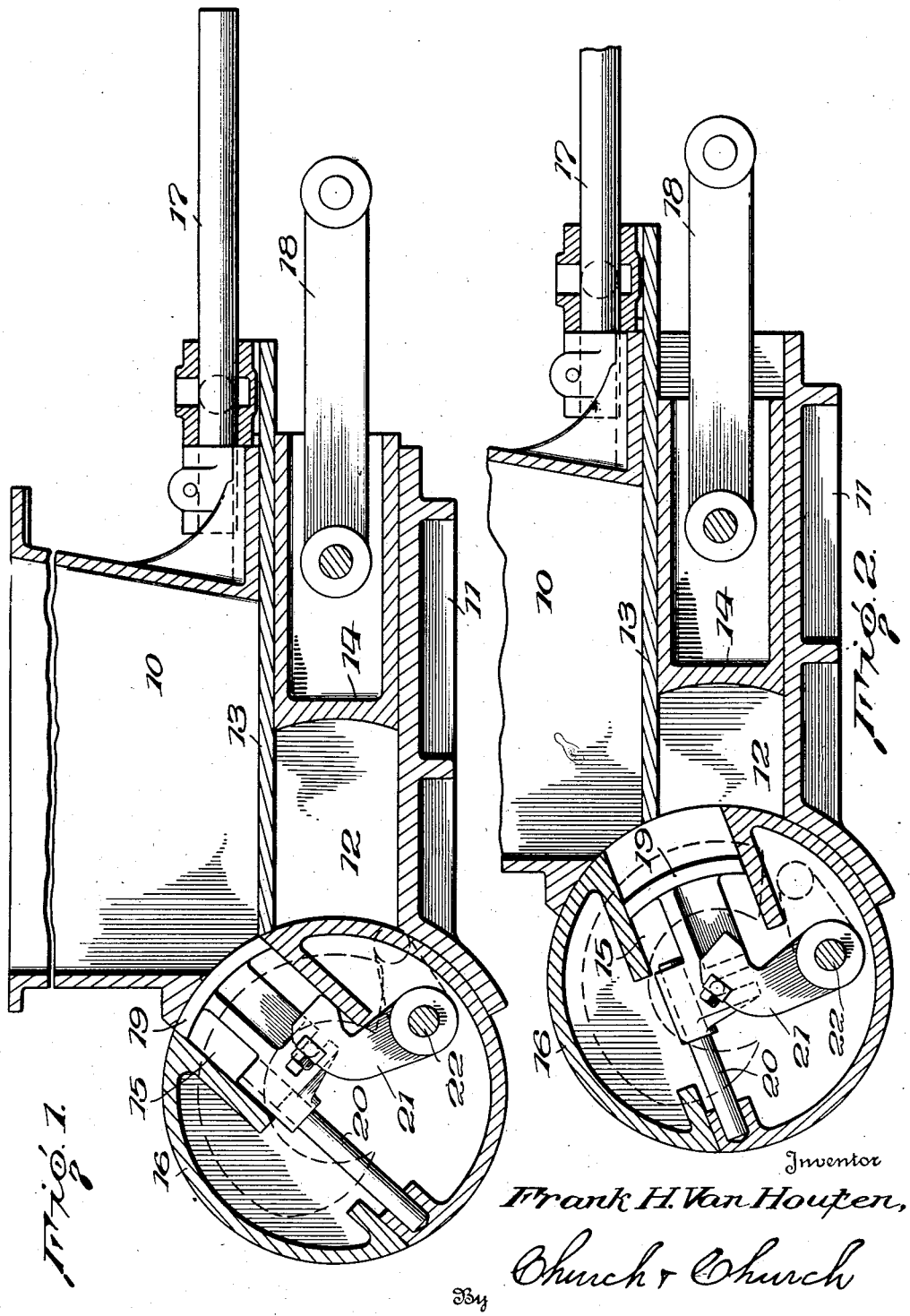

1,965,516

UNITED STATES PATENT OFFICE 1,965,516

AUTOMATIC DOUGH DIVIDER

Frank H. Van Houten, Beacon, N. Y., assignor to Dutchess Tool Company, Beacon, N. Y., a corporation of New York Application August 24, 1933, Serial No. 686,630

4 Claims. (Cl. 107—15)

This invention relates to improvements in dough handling apparatus and particularly to dough dividers of the type embodying rotary dividing or measuring heads.

Dividers of this type comprise a hopper for the mass of dough and a compression box into which dough is fed from the hopper, usually by gravity. A reciprocatory plunger forces dough from said box into one or more measuring pockets of a rotary dividing or measuring head. The periphery of said head forms a closure for one end of the box except, of course, when the pockets are in registry with the box for reception of an increment of dough. During the compression stroke of the plunger, the opening or passage between the hopper and box is closed by a knife which also functions to sever dough in the compression box from that in the hopper. Heretofore, in structures of this type, air trapped in the compression box, when the passage between the box and hopper is closed by the knife, interferes with and renders impossible an accurate scaling or measuring of the dough and the primary object of the invention is to eliminate this feature and obtain an accurate scaling of the dough. More specifically, the invention contemplates the provision of means for venting air from the box preliminary to forcing the dough from the box into the measuring pockets of the divider head.

In carrying out the invention, the preferred construction consists in having the knife abut against the periphery of the divider head on the compression stroke of the plunger, the knife and head jointly forming a closure for the passage between the hopper and compression box during the initial portion of the compression stroke of the plunger until the pocket in the head advances past the knife whereupon air then trapped in the box will escape through the opening formed in the periphery of the head by the pocket.

With these and other objects in view the invention consists in certain details of construction and combinations and arrangements of parts, all as will hereinafter be more fully described and the novel features thereof particularly pointed out in the appended claims.

In the accompanying drawing illustrating the preferred embodiment of the invention, Figure 1 is a vertical sectional view through the divider or measuring head and the hopper and compression box, the knife being shown fully advanced to form, in conjunction with the head, a closure for the passage between the head and box; and Fig. 2 is a similar view, but showing the head advanced to a position where air is free to escape from the box.

The hopper 10 above the frame 11 of the machine is adapted to contain the mass of dough, a portion of the dough being free to move by gravity into the compression box 12 when the reciprocatory knife 13 and compression plunger 14 are retracted. As is also customary in machines of this type, the dough deposited in box 12 is severed from the main mass by the knife 13, the latter being advanced to accomplish this preliminary to the advance of the compression plunger 14 which forces the dough from the box into a pocket 15 in the divider head 16. The knife 12 has a stem 17 and the plunger 14 has a pitman 18, said stem and pitman being connected with suitable operating connections for actuating the knife and plunger in proper timed sequence with respect to each other and also with respect to the divider head which is revolved by suitable drive connections. Any number of pockets 15 may be provided in head 16 and in each pocket there is a plunger 19 capable of sliding radially of the head on a pin 20, reciprocatory motion being imparted to plunger 19 by suitable operating connections which, in the present instance, are illustrated as embodying an arm 21 on a shaft 22 for moving the pocket plunger outwardly in proper timed relation to the rotary movement of the head. These portions of the machine, and their mode of operation are common in the art and hence, the details of the entire mechanism for actuating them are not shown nor described herein.

As heretofore stated, in the present machine, the opening or passage through which dough passes from the hopper 10 to compression box 14 is closed jointly by the periphery of divider head 16 and knife 13 as distinguished from those structures wherein the knife alone closes the entire opening. This opening must, of course, be closed at least during the greater portion of the compression stroke of plunger 14, in order to prevent the dough moving back into the hopper.

In Fig. 1, the pocket 15 is about to move into registry with the compression box but the opening between the hopper and box has been closed, as shown in this figure, since the knife 13 moved into engagement with the head preliminary to the compression stroke of plunger 14. Under these conditions, a quantity of air will be trapped and, if not vented or permitted to escape, will interfere with the pocket or pockets being filled with uniform quantities of dough during successive revolutions of the head. Therefore, by having the head constitute a portion of the closure for the opening between the hopper and box, when the pocket or pockets advance into registry with the box during the latter portion of compression stroke of the plunger 14, interruption formed in the peripheral surface of the head by the pocket, will permit such entrapped air to escape. Preferably, the air is vented to the hopper so that any dough that escapes will also be returned to the hopper. In this way there is no hindrance to the movement of the dough into the pocket or pockets and a uniform scaling or measurement of the dough is obtained.

What I claim is:

1. In a dough divider, a rotatable divider head having a pocket therein, a compression box, a hopper having an opening through which dough passes to said box, a compression plunger for forcing dough from said box into said pocket, and means for closing said opening during the compression stroke of said plunger, said pocket forming a by-pass during a portion of the movement of said head to vent air from said box during a portion of the compression stroke of said plunger.

2. In a dough divider, a divider head having a pocket therein, a compression box, a hopper having an opening through which dough passes to said box, a plunger for compressing dough in the box and forcing it into said pocket, and means comprising said head for closing said opening during the compression stroke of said plunger, said pocket forming a vent for air trapped in said box during said compression stroke.

3. In a dough divider, a hopper, a compression box communicating with said hopper, a divider head having a pocket therein movable into and out of registry with said box, a plunger for forcing dough from said box into said pocket, a reciprocatory knife, and means for advancing said knife into contact with said head to completely close communication between said box and hopper, said knife being spaced from the wall of said hopper when said knife is so advanced to provide a passage through which air trapped in the closed compression box is vented when said pocket moves into registry with said box.

4. In a dough divider, a hopper, a rotary divider head having a pocket extending radially inward from its periphery, a compression box communicating with said hopper, a reciprocatory plunger for forcing dough from said box into said pocket, a reciprocatory knife, and means for advancing said knife to sever dough in the box from dough in said hopper, said knife when fully advanced contacting the peripheral surface of said head and completely closing communication between said box and hopper, there being a space between said knife and hopper wall through which air trapped in said closed box is vented when the pocket in said rotary head moves into registry with the box.

FRANK H. VAN HOUTEN.